United States Patent [19]

Banks

[11] 4,257,231
[45] Mar. 24, 1981

[54] HEAT ENGINE

[76] Inventor: Ridgway M. Banks, 1303 - B Stannage Ave., Berkeley, Calif. 94702

[21] Appl. No.: 78,836

[22] Filed: Sep. 25, 1979

[51] Int. Cl.³ .............................................. F03G 7/06
[52] U.S. Cl. ..................................................... 60/527
[58] Field of Search .......................... 60/527, 528, 529

[56] References Cited

U.S. PATENT DOCUMENTS

| | | | |
|---|---|---|---|
| 1,134,147 | 4/1915 | Miller | 60/527 |
| 2,729,756 | 1/1956 | Euler | 60/527 X |
| 3,913,326 | 10/1975 | Banks | 60/527 |
| 4,086,769 | 5/1978 | Smith | 60/527 |
| 4,197,708 | 4/1980 | Milton | 60/527 |

FOREIGN PATENT DOCUMENTS 2360535  6/1975  Fed. Rep. of Germany ............. 60/527

*Primary Examiner*—Robert G. Nilson
*Attorney, Agent, or Firm*—Bruce & McCoy

[57] ABSTRACT

A heat engine for developing rotational energy from elements of thermodynamic working material. Elements of the material are secured between levers. The cycling of the elements through hot and cold temperature changes causes the levers to reciprocate. The reciprocating movement is then mechanically translated into rotational energy.

14 Claims, 7 Drawing Figures

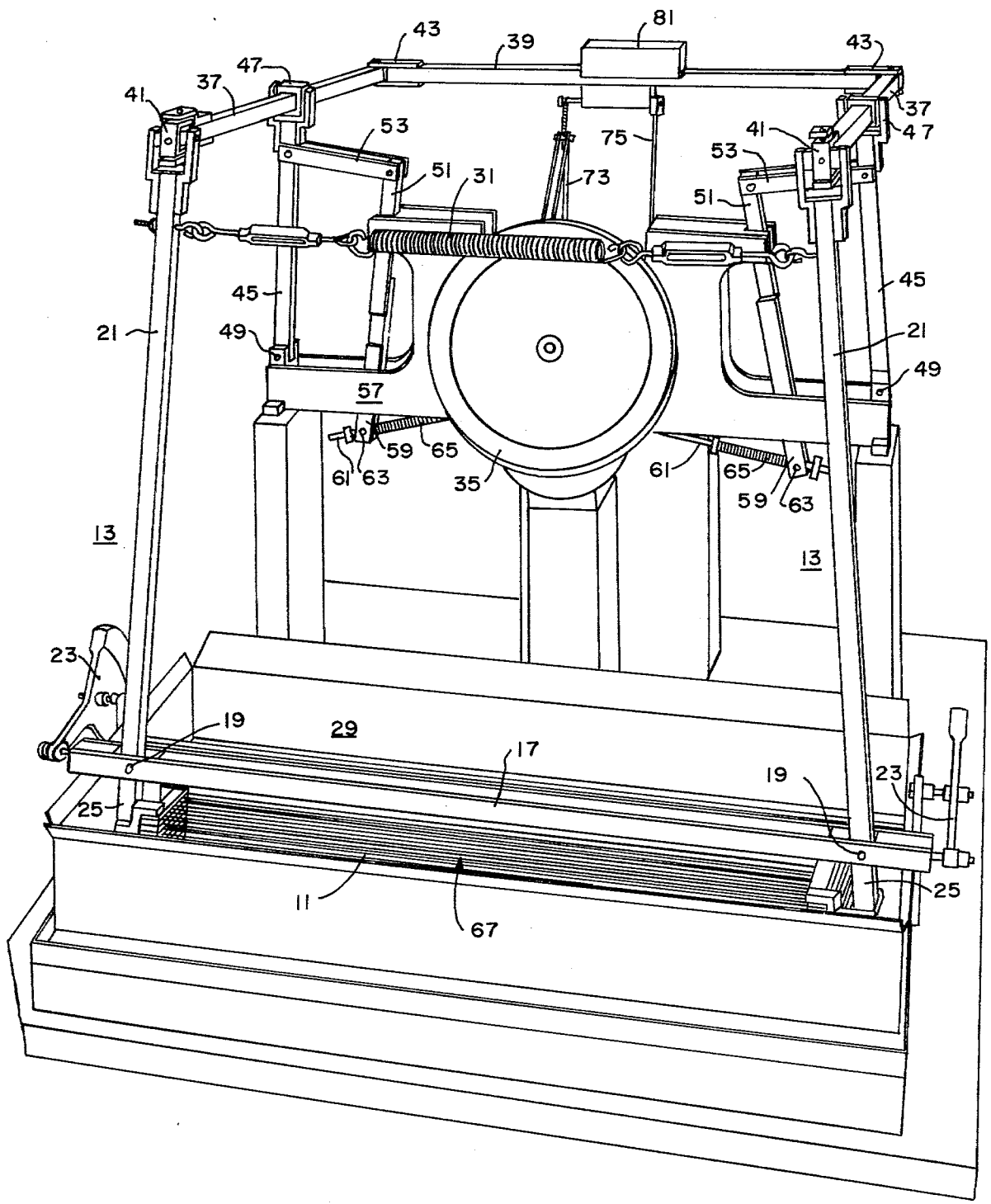
FIG.—1

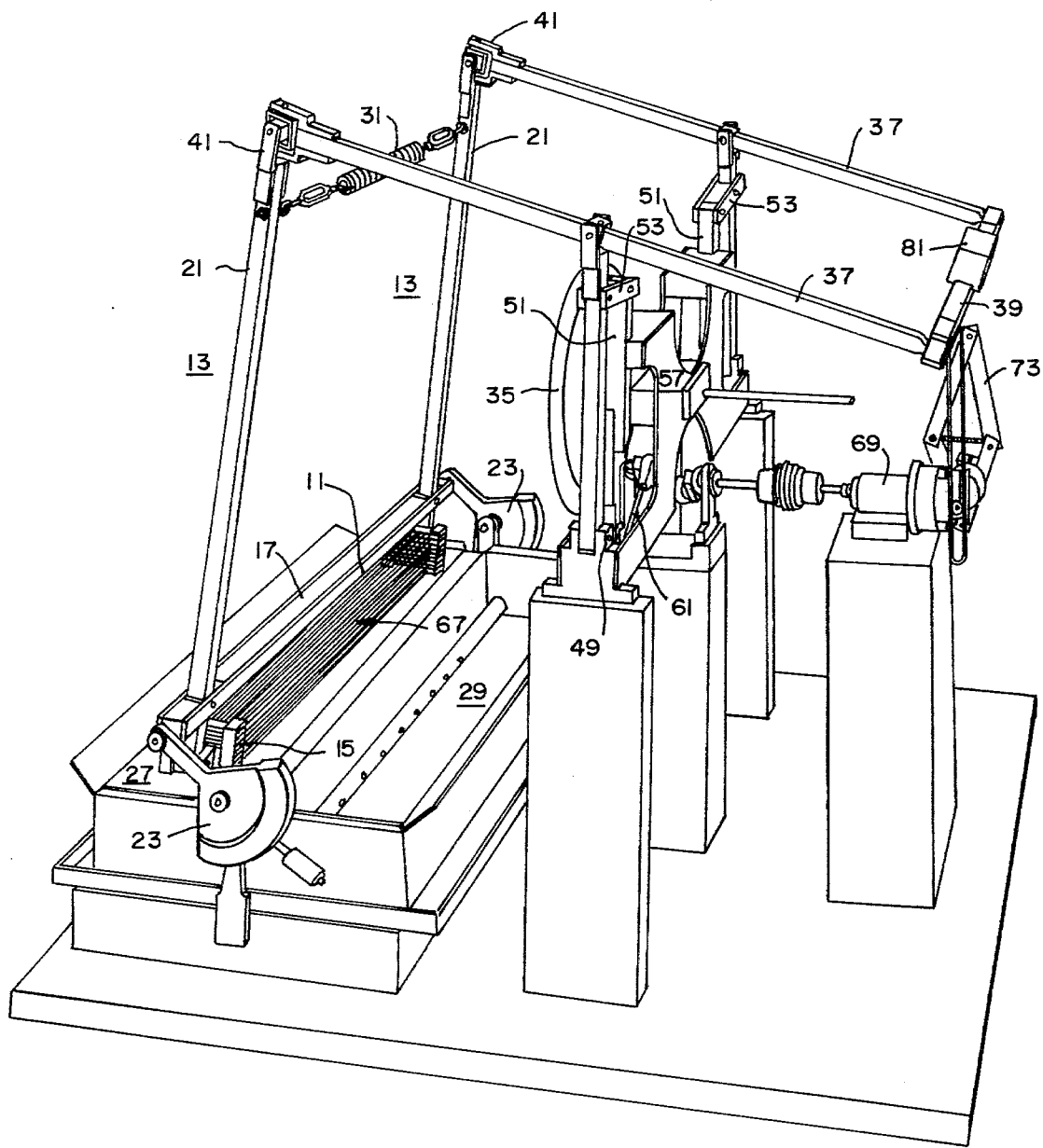
FIG.—2

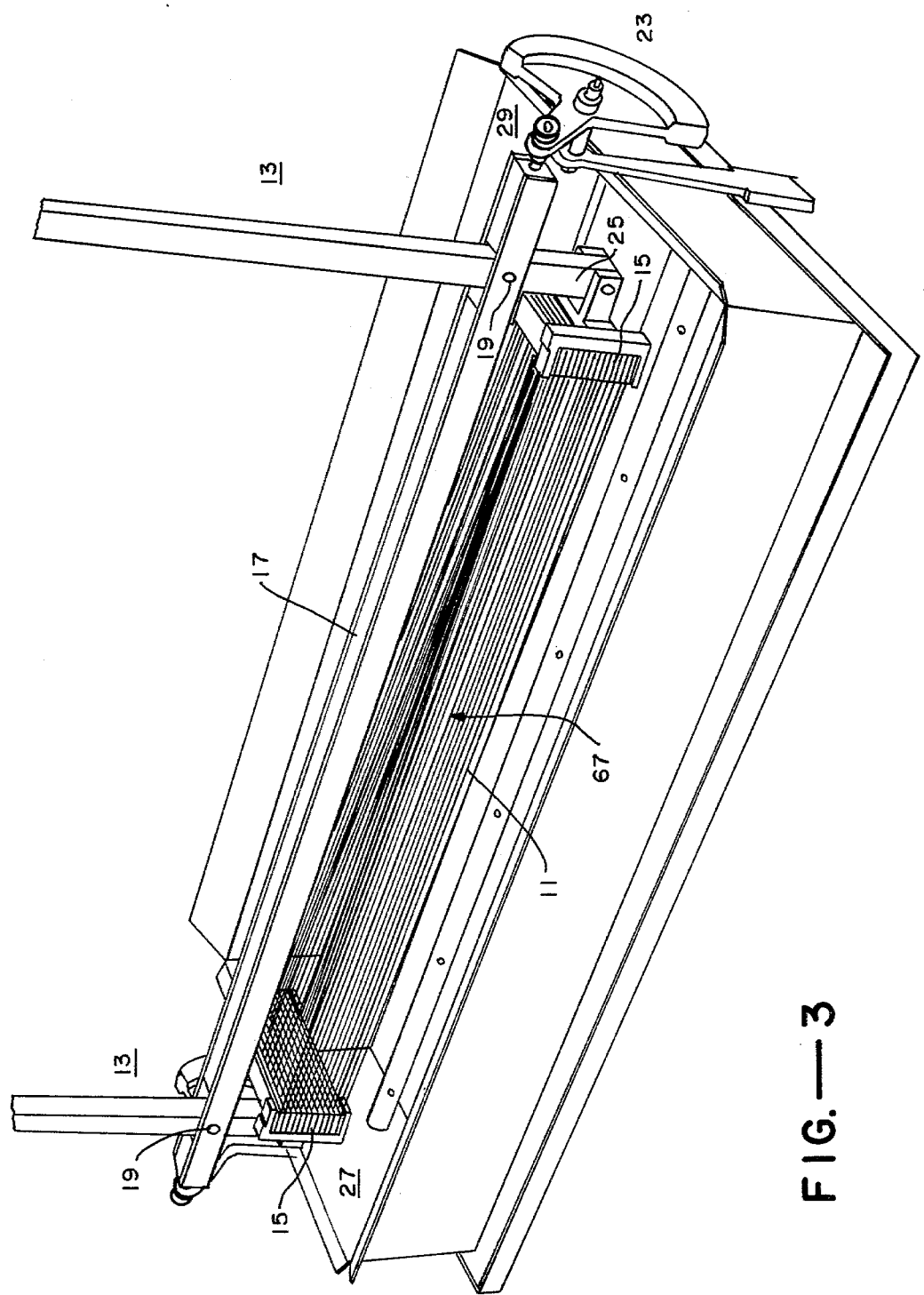
FIG.—3

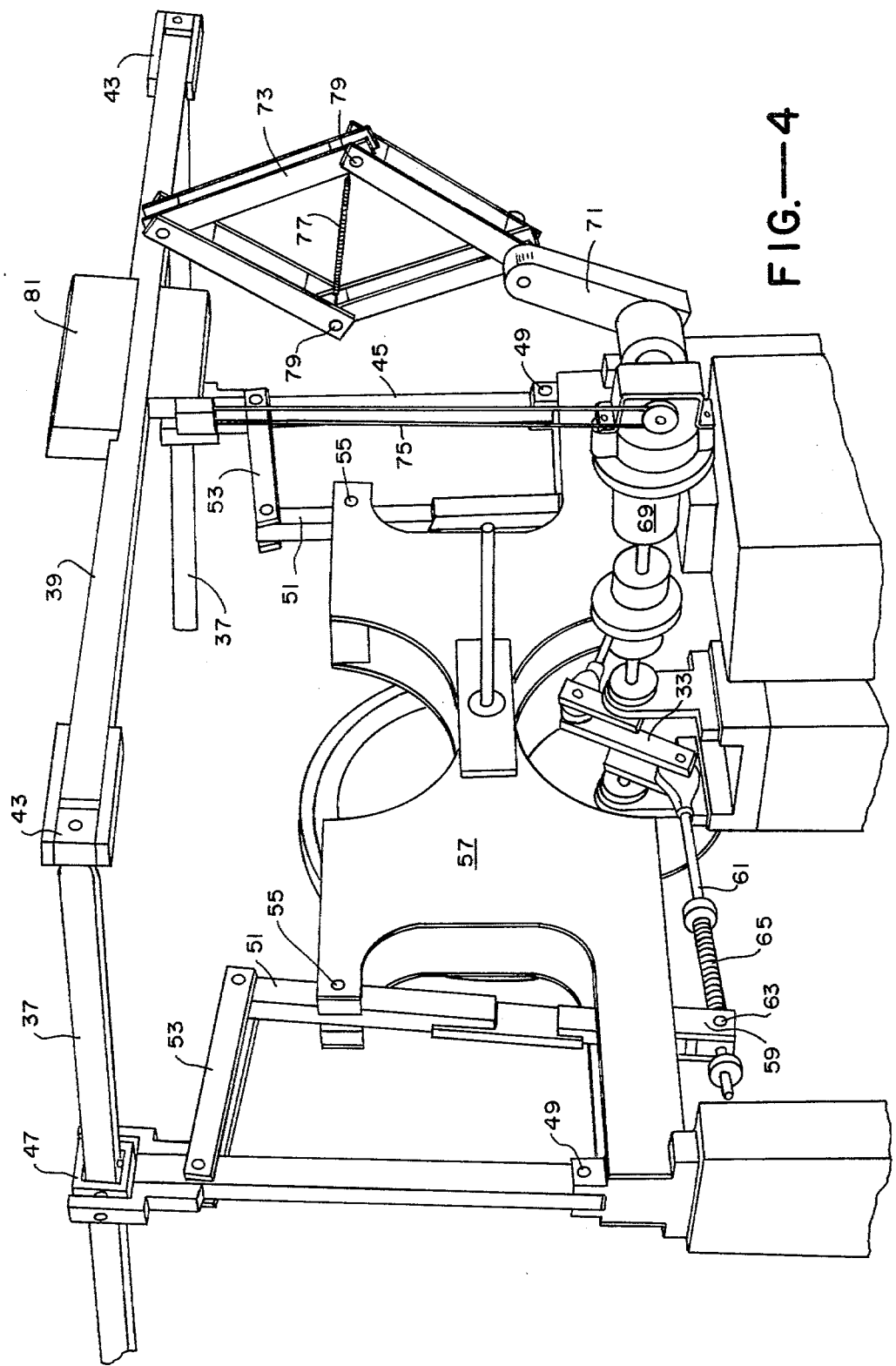
FIG.—4

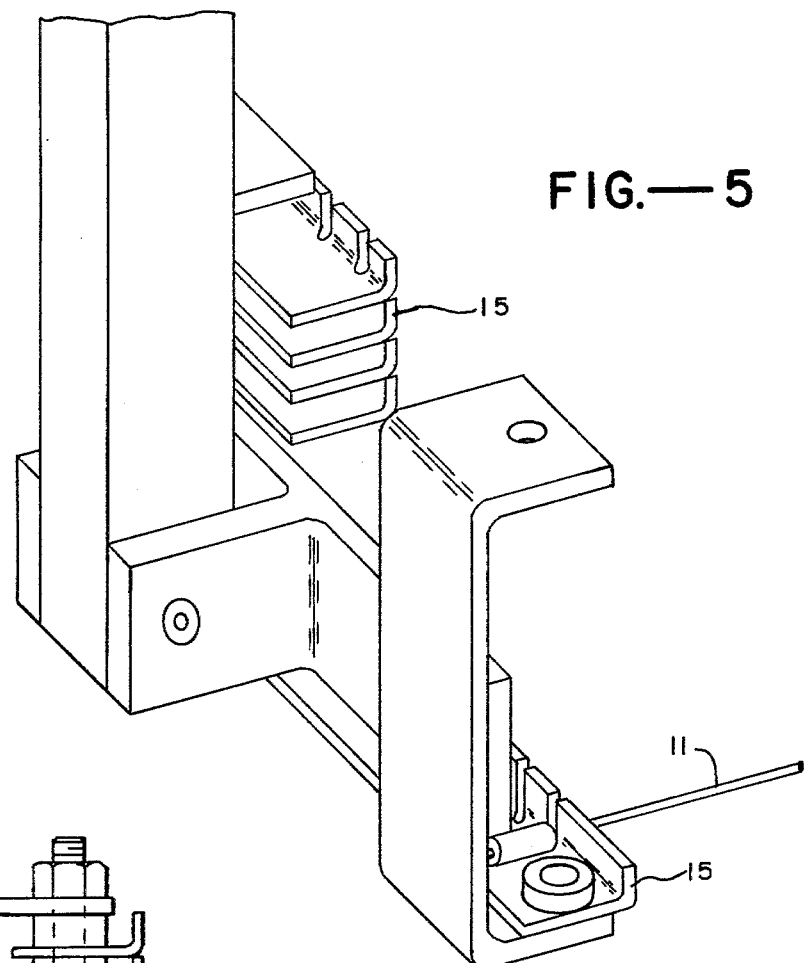
FIG.—5
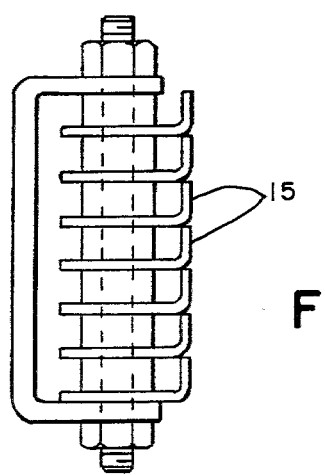
FIG.—6
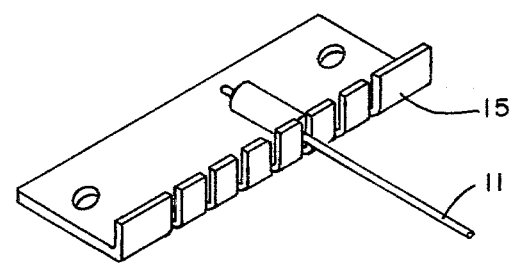
FIG.—7

HEAT ENGINE

BACKGROUND OF THE INVENTION

1. Field of the Invention

The present invention relates to heat engines and more particularly to nitinol powered heat engines.

2. Description of the Prior Art

The inventor of the present invention is also the inventor of the Banks engine, U.S. Pat. No. 3,913,326 issued Oct. 21, 1975, which was the first and remains the only proven reliable nitinol engine. The "Background of the Invention" section of that patent sets forth in part the status of the prior art at the time of that invention. The "Summary of the Invention" section of that patent describes the thermodynamic working material as a thermally responsive memory material, such as nitinol, which is used to power the present invention.

Since the development of the Banks Engine, many investigators have studied the concept and tried to improve upon it but with little success. Probably the best summary of all of the subsequent work has been set forth in an article by William S. Ginell, Joseph L. McNichols, Jr. and John S. Cory, published in the May 1979 issue of Mechanical Engineering Magazine at page 28 entitled "Nitinol Heat Engines for Low Grade Thermal Energy Conversion". As stated therein "(A)ll the (nitinol heat) engine designs appear to fall into five catagories: offset crank, turbine, field, swash plate, and hydraulic engines. Of these five, operational examples of only the first three types have been reported" (p. 28). The art in the field of nitinol heat engines is very limited and prior to the present invention, none of the designs have proven to be one which could be utilized for productive work. As stated further in the article, "(A)lthough small nitinol heat engines have been built and operated, their efficiencies and output powers have been low and attempts to produce an engine of practical size have not been successful (p. 31)."

None of the prior art designs provide a physical arrangement that thermally cycles the powering material and changes phase simultaneously to produce unified power. All of the designs prior to the present invention change phase in steps, or successively, and obtain only a portion of the power potentially available in the machines during any particular time segment of a power cycle. Usable power, therefore has not been developed by prior art devices. Further, the only machine which has been successfully operated for a long period of time is the Banks engine.

SUMMARY OF THE INVENTION

There are many problems in developing a nitinol engine to produce a useful energy output. These problems have also made it very difficult to devise a reliable and practical machine. There are basically four different problems which are interrelated and which have prevented the development of a useful machine prior to the present invention.

The first problem is one of heat transfer. In order to effect the phase change of the nitinol, it is necessary that the heat transfer be accomplished relatively uniformly and quickly throughout the material. Otherwise, undesirable stresses occur which can destroy the material. Thus, an effective means for thermally cycling material must be provided. The means provided so far, has kept the thickness of the material quite thin rather than trying to increase effectiveness of the heat transfer from the heat source to the interior of the nitinol. Further, the best way of achieving effective heat transfer is by using thin round wires of nitinol to obtain the maximum heat transfer area for the material so that the heat source can surround the nitinol and does not have to penetrate very far. It is possible that the heat in a primary source could be transferred to a second medium, which has a more effective heat transfer property, to transfer the heat into the nitinol and remove it, but at the present time, such a medium is not known. Therefore, it seems that any machine which is to be powered by nitinol will have to be powered by thin wires which causes a severe design parameter limitation.

The second problem has to do with the fact that all previous machines utilizing nitinol wire have used a bent wire which through thermal cycling is straightened to some degree and then returned to its bent configuration. It is obvious that to obtain greater power a straight wire configuration needs to be used that will take advantage of the shortening and lengthening property of the wire and the tremendous force that can be developed by the phase change transformation due to the tensile strength of the nitinol.

However, a straight wire configuration has two major problems,

The first of these is that a straight wire only develops power in one direction and that occurs when it is heated and passes through the phase change and shortens. This is the power stroke. When it is thermally cycled back below the phase change temperature, the wire simply goes slack. The problem is how do you take up the slack to put the wire back into position for providing a power stroke. In addition, the wire provides no power for doing so when it goes slack since in longitudinal compression it just bends. One attempt to solve the problem is the turbine continuous wire design. However, no engine prior to the present invention has been able to use a straight discontinuous nitinol wire to provide power.

The fourth problem, and the most challenging and complex, is the fact that once the phase engine temperature of the nitinol is reached, the change in length of the wire occurs very rapidly although it appears not to be instantaneous. Thus, if a nitinol wire is restrained in tension to effect a power stroke, and is then heated above the phase change temperature, it shortens dramatically in a short period of time and the mechanism which is to extract the power from the shortening process must accommodate that rapid stortening. The power extracting mechanism needs to utilize the strength of the wire to deliver the power and yet not overstress the wire beyond its deformation point during the phase change process. If the wire is mechanically deformed during the shortening cycle by restraining it too severely and stretching it, the wire will ultimately fatigue and fail. Thus, it is necessary that a very sophisticated mechanism be utilized to extract the power from the nitinol wire which will be able to absorb considerable energy in a short period of time and then convert that to useful motion.

The most obvious direction for inventors to proceed to seek a solution for overcoming those problems has been to utilize a continuous straight wire in the turbine type engine applications described in the prior art. Those investigations however have proven relatively unsuccessful due to the many problems that the continuous wire creates. So far as is known there has been no other type of device designed which can make use of thermal cycling a straight nitinol wire except in the continuous loop of a turbine.

Prior to the present invention, there has not been any machine which could solve all four above-described problems and yet provide a device which could be scaled up from its basic unit to provide useful power either by increasing the size of the basic unit or utilizing an interconnected multiplicity of basic units. Eash time a solution to one of the four basic problems is proposed, it usually creates more problems than the four described above and usually the new problems seem to conflict with the solutions to the other three problems of the basic four. Applicant's present invention provides a solution to all four of the basic problems and one which ultimately can be utilized on bigger and larger machines or by utilizing larger or a multiplicity of interconnected machines to provide useful power.

The present invention is a heat engine which has a multiplicity of thermally responsive elements of a thermal memory material, nitinol, secured between the ends of a pair of primary power levers. The thermally responsive elements have the memory property characteristic of shortening and lengthening when thermally cycled. A journal means is provided for each of the primary levers so that as the thermally responsive elements are thermally cycled to shorten in length, the ends of the levers to which the elements are attached are drawn towards each other and the opposite or free ends of the power levers separate from each other. An energy storage means is connected to the power levers to effect the storage of energy when the thermally responsive elements are cycled to shorten so that subsequently, when the thermally responsive elements are thermally cycled to elongate, the energy storage means separates the ends of the levers to which the thermally responsive elements are attached. A means is provided for thermally cycling the thermally responsive elements, and a further means is provided for absorbing and translating the reciprocating motion of the levers into rotational motion when the elements are thermally cycled. This includes power absorbtion means and a series of secondary levers secured to the free ends of the primary levers. The series of secondary levers are in turn interconnected to a crankshaft which converts the reciprocal motion of the primary levers into rotational motion.

The present invention also contemplates a new and unique method of extracting power from thermally responsive memory elements in the form of a piece of straight wire. It comprises first arranging the element in tension between the ends of a pair of power levers which are the mirror image of each other. The thermally responsive element has the memory property characteristic of shortening and lengthening when thermally cycled. The element is first thermally cycled to shorten thereby drawing the ends of the levers to which the elements are attached towards each other and causing the other free ends to separate. The motion produced by the separation of the free ends of the levers is absorbed in a mechanical power absorption means. A portion of the absorbed energy is stored in an energy storage means. The absorbed energy is converted mechanically to rotational energy. The elements are then cycled to lengthen and the stored energy is used to separate the ends of the power levers which are attached to the element. The cycle is then repeated.

OBJECTS OF THE INVENTION

It is therefore an important object of the present invention to provide a heat engine which can utilize a straight wire thermally responsive memory material, such as nitinol, as the power source.

It is also an object of the present invention to provide a nitinol heat engine which utilizes all of the thermally responsive memory material elements in a basic engine to thermally cycle concurrently rather than utilizing a series of elements to thermally cycle continuously or successively.

It is another object of the present invention to provide a nitinol heat engine which can employ a multiplicity of nitinol wires arranged in parallel that can be alternately immersed as a unit in different temperature parallel baths to thermally cycle the wires.

It is a further object of the present invention to provide a nitinol heat engine which multiplies the work output of a thermal phase change of a nitinol element proportional to the number of elements, or amount of nitinol material utilized in the engine, to increase the work output.

It is yet another object of the present invention to provide a nitinol heat engine which absorbs the work output of a rapid phase change of thermally cycled elongated nitinol wire and transforms the output into a relatively constant speed rotational motion.

And it is still a further object of the present invention to provide a nitinol heat engine which can be increased in power output without changing the thermal characteristics of the nitinol elements, such as by having to change their size or configuration; the increase is effected by simply increasing the number of nitinol elements to permit scale up without having to significantly recalculate the thermodynamics of the nitinol material. Only the mechanical takeoff apparatus for the power generated by the nitinol elements need be increased to accommodate the power increase.

Other objects of the present invention will become apparent when the description of the preferred embodiment is considered in conjunction with the accompanying drawings.

DESCRIPTION OF THE DRAWINGS

FIG. 1 is a front perspective view of the present invention;

FIG. 2 is a side perspective view thereof;

FIG. 3 is a partial front perspective view thereof;

FIG. 4 is a partial rear perspective view thereof;

FIG. 5 is a partial view of the journal attachment of a nitinol wire holder to its power lever;

FIG. 6 is a side elevation of the nitinol wire holders; and

FIG. 7 is a perspective view of a single nitinol wire holder bracket with a nitinol wire disposed therein.

DESCRIPTION OF THE PREFERRED EMBODIMENT

The present invention is a heat engine utilizing thermally responsive elements of a thermal memory material. Such materials are disclosed in general in my prior U.S. Pat. No. 3,913,326. Other materials may be discovered which react in the same manner but are not presently known. As such, they could be suitable for use in the present invention. Thus, this disclosure contemplates the use of any such thermally responsive memory material to power the engine disclosed herein.

In the present invention, a multiplicity of thermally responsive elements 11 of a thermal memory material, such as nitinol, are secured between the ends of a pair of primary power levers 13. The elements have the memory property characteristic of shortening and lengthening when thermally cycled. Nitinol wire is used in the present invention as the thermally responsive elements which react to thermal cycling. The nitinol is used in the form of a wire to better effect the phase change of the nitinol more uniformly because heat penetration into a series of wires can be more effectively achieved than by use of any other known physical configuration of nitinol.

In the preferred embodiment of the present invention, a series of parallel nitinol wires are secured between brackets 15. The parallel orientation of the wires permits them to be immersed relatively simultaneously in a bath. As a result, they all change phase within a relatively short period of time which in effect is simultaneously. A variety of different wire securement means may be utilized, but in the present invention, pieces of tubular metal are swaged onto the ends of the wires at equal distances along the lengths of each wire, and then the wires are mounted in slotted holders 15 so that the wires have the freedom to rotate slightly in a horizontal plane and to a greater degree in a vertical plane whereby they are not rigidly held in the wire mounts.

The thermally responsive elements of nitinol wire have the memory property characteristic of shortening and lengthening when thermally cycled. The wire is preworked in the cold state so that it lengthens when cooled below the phase change temperature and shortens when heated above the phase change temperature.

The primary power levers are journalled so that as the thermally responsive elements of nitinol wire are thermally cycled to shorten in length, the ends of the levers to which the elements are attached are drawn towards each other and the opposite or free ends of the levers are caused to separate from each other. This journalling is effected in the present invention by a front spreader beam 17 which is disposed between the levers and provides a pair of rocker shafts 19 on which the primary levers are journalled. The beam is formed to extend beyond the journals interconnecting the levers so that the levers rock within the frame of the front beam. The journal location of the front spreader beam on each of the power levers is equal distant from the mounting of the nitinol wires on the lower ends of the levers and between that mounting point and the free ends 21 of the levers.

The ends of the front spreader beam are journalled to a counter-weighted shaft 23 which in turn is journalled to rotate and swing the front beam through an arc of approximately 180 degrees. By this arrangement, of mounting the front beam on a counter-weighted shaft, the lower ends 25 of the primary levers and the front spreader beam can be rotated as a unit and the wires can be immersed in a bath at both of the lower ends of the arc. The direction of motion of the counter-weighted shaft is reversed to lift the nitinol wire assembly up and out of the first bath 27 and through an arc whereby the wires are then immersed in a second bath 29. These baths are different temperature liquids, usually water, arranged in a pair of parallel troughs disposed on opposite sides of the center line of the axis of rotation of the counter-weighted shaft which supports the front spreader beam.

The journal arrangement of the primary power levers on the front spreader beam is arranged to permit the lower ends to which the nitinol wire assemblies are attached to be drawn towards each other as the nitinol wires are thermally cycled to shorten in length. At the same time, the opposite upper free ends of said levers separate from each other. This cycle is considered the power stroke.

An energy storage means is connected to the primary power levers to effect the storage of energy when the nitinol wires are cycled to shorten so that subsequently the energy storage means provides the power to effect separation of the ends of the levers to which the wires are attached when the wires are thermally cycled to elongate. As the wires are immersed in the cold bath and change phase, they lengthen and a means be provided to take up the slack and keep the wires taut so as to reposition or cock the primary levers for the power stroke. In the preferred embodiment of the present invention, this is effected by a spring 31 which is engaged with the upper or free ends of the primary power levers urging them towards each other, thereby in effect, separating the opposite ends of the primary levers to which the nitinol wires are attached to keep them taut until they are transferred from the cold bath to the hot bath for the power stroke. As the power stroke occurs, the spring is stretched storing energy until subsequently, when the wires are immersed in the cold bath to lengthen, the spring takes up any slack which occurs in the wires due to the lengthening cycle. Numerous other mechanical devices could be used to provide this same energy storage, but for purposes of simplicity, the spring works very effectively without fatigue and with low internal friction whereby it can be adjusted to impose just enough force on the wires to keep them taut and thereby cause very little energy loss in the work cycle.

A means is provided for thermally cycling the nitinol wires. In the preferred embodiment, the two parallel elongated different temperature baths 28, 20 are provided along with a driving means for alternately moving the wire assembly from one bath to the other with sufficient rapidity and timing to permit all of the wires to effect the phase change relatively simultaneously. The baths are flooded with liquid, usually water, which must be continually flushed to keep relatively constant temperatures in the two baths for the desired temperature differential depending upon which composition of nitinol wire is used. The wire composition determines the temperature of the phase change. It has been found that nitinol wire similar to that described in U.S. Pat. No. 3,913,326 permits the engine to be operated on a temperature differential as small as approximately 16 degrees Fahrenheit with a median or phase change temperature of approximately 40° Fahrenheit.

A means must be provided for absorbing and translating the reciprocating motion of the primary levers into rotational motion. In the present invention, this includes a series of secondary levers secured to the free ends of the primary power levers and the series of secondary levers are in turn interconnected to a crankshaft 33 which converts the reciprocal motion of the primary levers into rotational motion. The rotational motion is turned into dynamic energy by turning a fly wheel 35 which in turn stores energy. This stored energy could be used, through a mechanical takeoff, as the means to keep the nitinol wires taut instead of the spring between the power levers, but it would seem that any such arrangement would be less efficient than that presently disclosed.

The series of secondary levers include a pair of walking beams 37 journalled at one of their ends to the upper free ends of the primary power levers and at their other ends to an interconnecting back spreader beam 39. The journal connection 41 of the walking beams with the tops of the primary or power levers is in the form of a universal joint which permitss the beams to freely swing horizontally and move up and down and rock back and forth within a limited range to follow the motion of the upper ends of the power levers. The rear journal connections 43 of the walking beams to the interconnecting back spreader beam are double axis journals to permit the walking beams to rotate and move through a small arc in the plane formed by the spreader beam and the walking beams.

A pair of power takeoff pylons 45 are journalled to the walking beams intermediate to their ends and support the walking beams. The journal connections 47 between the pylons and the walking beams are also universal joints to accommodate the side to side and up and down motion of the walking beams. The pylons are also journalled 49 at their lower ends to permit them to accommodate the side to side motion of the walking beams which occurs as the upper ends of the primary power levers separate and close. The pylons are interconnected to a pair of secondary power takeoff levers 51 by a pair of drive links 53 proximate to their upper ends. The secondary power takeoff levers are journalled 55 to the frame 57 of the engine for single axis motion and their lower ends 59 are connected to connecting rods 61. The connecting rods are in turn journalled to the crankshaft which drives a fly wheel and a timing mechanism for synchronizing and assisting the operation of the engine.

A means for absorbing the reciprocating motion of the power levers is an integral part of the means for translating the reciprocating motion of the power levers into rotational motion. In the preferred embodiment, the power absorption system is arranged on the connecting rods to cushion the shock on the engine which results from the swiftness with which the phase change of the nitinol wire takes place. As the wire is immersed in the hot bath, it shortens very quickly and snaps the upper ends of the power levers open which in turn drives the lower ends of the secondary power takeoff levers toward the crank shaft. However, a sliding connection 63 is provided between the connecting rods and the lower ends of the secondary power takeoff levers to permit the connection to slide inward toward the crankshaft along the connecting rods compressing a spring 65 mounted on the connecting rods. The spring absorbs the energy and stores it until such time as the connecting rod moves a sufficient distance inward toward the crankshaft to catch up with the thrust of the lower end of the secondary power lever along the connecting rod. At that time, the spring expands back to its full length driving the connecting rod to the end of its power stroke on the crankshaft. Thus, the springs on the connecting rods iron out power fluctuations caused by the rather dramatic shortening of the wires which occurs as they are immersed in the hot bath and undergo a phase change.

An improvement in the system would require the power absorbtion means to be located between the wires and the levers to lower the amount of mechanical mass of the engine which is experiencing the rapid movement resulting from the swift phase change.

The fly wheel is provided to also help dampen out the power shock imposed on the engine and to provide a relatively steady RPM to the device and to store the reciprocating motion as dynamic energy. It also stores energy during the power stroke to lift the wire assembly 67 and the attendant mechanism out of the baths and effects the transfers between the baths to cause the successive power strokes.

A takeoff drive from the crankshaft is provided to power a timing device. It drives a gear box 69 with a right angle drive which has a two to one step up gear ratio. This drives a timing crank 71 which is secured to a collapsible hinged link 73 which pulls down on the rear spreader beam to lift the power levers and the nitinol wire assembly when they are being transferred from one bath to the other. A stop in the form of a chain or wire stop 75 is also provided to prevent the back spreader beam from rising too high and thereby limiting the downward motion of the primary power levers into the parallel baths so that the machine does not bottom out or incur mechanical interference with the rest of the structure forming the thermal cycling mechanism.

The pull down linkage 73 is collapsible so that as it moves upward it can accommodate the face that the back spreader beam has not moved high enough to permit a rigid link between the timing crank and the back spreader beam. A spring 77 between the intermediate journals 79 of the hinged link is arranged in tension and keeps the link pushing upward gently on the back spreader beam during the upward stroke of the crank to hold the wires in whichever bath they are immersed until it is time to extract them by pulling down on the back beam. The collapsible link is in effect a cam actuating the back spreader beam. A spring loaded connecting rod, similar to the pair connected to the crankshaft can be used to serve the same purpose and eliminate the chain and the collapsible hinge.

The heat engine can run in either direction, but a bias can be imposed upon the timing means through the timing crank 71 to pull down on the levers at a preferred time, depending on which direction it is desirable to have the crank shaft rotate. Simple experimentation determines the imposition of that timing bias by advancing or retarding the degree of lead or lag on the timing crank. Many other mechanical means of taking power off of the primary power levers and delivering it to a crank shaft will become obvious as further consideration is given to the mechanical mechanism of the device.

The back spreader beam can be provided with a counterweight 81 to help offset the weight of the power levers, the front beam, and the nitinol wire assembly which in the preferred embodiment are not completely offset by the counter-weights on the shafts journalling the front spreader beam.

The present invention also contemplates the unique method of extracting power from thermally responsive memory material in the form of straight wire. Prior to this time, no one has been able to do it. The process can be broken down into several steps which can then be repeated to create continuous usable rotational energy.

In its simplest steps, the process includes the first arranging the straight wire nitinol element in tension between the ends of a pair of power levers which are the mirror image of each other. The wire must have been preworked to have the memory property characteristic of shortening and lengthening when thermally cycled.

Second, the wire is thermally cycled to shorten thereby drawing the ends of the levers to which the wire is attached toward each other whereby the other or free ends of the levers separate.

Third, the motion produced by the separation of the free ends of said levers is mechanically absorbed.

Fourth, a portion of the absorbed energy is stored either statically, such as by lifting a weight, or dynamically such as by means of a spring or fly wheel.

Fifth, the wire is thermally cycled to lengthen.

Sixth, the stored energy is used to separate the ends of the power levers which are attached to the wire to keep it taut; and Seventh, the cycle is repeated indefinitely.

Once the method of the present invention has been broken down into these basic steps and taught to skilled mechanics, any number of mechanical devices different from the preferred embodiment of the present invention can be and will be thought up to practice the methd of the present invention.

It is obvious that there exists the possibly that the machine taught by this disclosure could be divided in half perpendicularly to the wire at their center, is really a mirror image of the other. As a result, one side should theoretically be able to operate independently, and future investigators may attempt to develop such a device in an effort to avoid this patent despite the disadvantages inherent in such a design.

This disclosure therefore contemplates a single lever nitinol wire powered heat engine as part of the present invention. It would include a multiplicity of nitinol wires secured to the end of a lever; the wires having been preworked to lengthen and shorten when thermally cycled. An energy storage means would be connected to the lever to keep the wires taut when the wires are thermally cycled to lengthen. The energy storage means would also reposition the lever for the power stroke. Means would be provided to thermally cycle the wires, and means would also be provided to absorb and translate the motion of the lever into rotational motion.

The means of translating the motion of the lever into rotational motion has the attractive possibility of requiring simply a spring loaded connecting rod, the same as taught by this disclosure, secured directly between the lever and a crankshaft, but then the mechanism for thermally cycling the wires becomes a problem, and the teachings of the preferred embodiment of the present invention offer the best solution to that problem.

The present invention has several important advantages. Primarily, the engine provides a device which utilizes discrete lengths of straight nitinol wire to power it. That arrangement extracts the greatest usable power nitinol can produce and it seems to occur when nitinol, held in tension, is shortened by a phase change. The present invention also provides an engine which utilizes of all of the nitinol power material to thermally cycle concurrently rather than relying upon or utilizing a series of elements to thermal cycle successively. As a result, a very strong power stroke is produced. The problem of the prior art devices which have proven to be operable is that the nitinol wire elements are thermally cycled serially to make the machine operate. This does not produce usable power.

In the present invention, all of the nitinol wires are immersed as a unit to change phase concurrently and exert all of the force inherent in the phase change at the same time. It is realized that this statement does not hold true if a multiplicity of similar arrangements are utilized in a single machine, or two or more machines are ganged together into one machine. However, if an engine is broken down into the basic component, all of the nitinol wires, in the present invention, work concurrently to exert the force at the same time. In all other devices, in the basic component, only a portion of the nitinol material operates in any portion of the cycle to effect the power stroke.

Another advantage the present invention offers is that it provides a nitinol heat engine which can employ a multiplicity of nitinol wires arranged in parallel so that they can be alternately immersed in different temperature parallel baths to thermally cycle the wire. The reason this is important is that any different physical configuration of an element of nitinol has the disadvantage of not utilizing a simple straight wire. Nitinol in a wire configuration has the property of changing phase very rapidly when subjected to the thermal penetration of a bath. It is an important advantage to put as much nitinol in as small a space as possible so it can be efficiently immersed in a bath. The most efficient design known when compared with all of the prior art is the mutiplicity of parallel wires of the present invention.

A further advantage achieved by the present invention is that of providing a nitinol heat engine in which the energy output is basically proportional to the amount of nitinol material utilized. In the present design, the increase of even a single additional wire proportionally increases the power. Adding additional wires increases the power output without any other physical change in the machine. No other nitinol engine is capable of making these power changes let alone as simply.

A very important advantage achieved by the present invention comes from providing a heat engine which can absorb the work output of the rapid phase change of a thermally cycled straight nitinol wire and which can transfer that phase change effect into a relatively constant speed rotational motion. The phase change occurs so quickly and with such force that prior to the present invention, no way had been found to harness it without having the wire be continuous or relatively unrestrained so that it could effect the phase change. Applicant's present invention provides a mechanical motion transformation machine which is able to absorb, store, and utilize the energy which is developed during the power stroke, which occurs when a nitinol wire shortens, until it can be transformed by mechanical apparatus into rotational energy of a relatively constant speed.

A still further advantage of the present invention lies in providing a nitinol heat engine which can be increased in power without changing the dimensions of the individual nitinol wire. This is done by simply increasing the number of wires to permit a scale up of the device without having to significantly recalculate the thermodynamics of the operative nitinol elements. The wires remain constant so that the bath temperatures and cycle times also remain constant and only the bath flow volumes need to change to accommodate the change in volume of nitinol material. Thus, only the mechanical takeoff elements need to be scaled up to handle the additional wires. In other words, due to the unknown properties of nitinol, and in order to provide consistent performance, it is necessary that a nitinol engine use the same known nitinol thermodynamic properties during scale up. In the present invention only the mechanical device for absorbing the work of the nitinol material need be increased to accommodate the increased amount of nitinol used to power the engine.

The present invention provides the first reliable nitinol heat engine which is capable of direct up for producing significant power outputs. No other heat engine of the Joule effect type —if this is truly what this engine is —prior to the present invention, known at this point in time, can claim this advantage.

It is obvious, since the problem of utilization of a multiplicity of nitinol wires to drive a mechanism has now been achieved with the desired reliability for long life, that a large number of mechanical adaptations can be made to absorb, store, and utilize the motion from the primary power levers and convert it to rotational or other usable energy. Thus, the important problems solved by the present invention include providing a device which extracts power from discrete lengths of nitinol wire; effecting the phase change of all the nitinol material simultaneously; and increasing the power output of the unit substantially by simply adding nitinol without changing the thermodynamic characteristics of the nitinol.

It will be seen from the foregoing description that all the objects and advantages claimed for the present invention are achieved. While the method and apparatus of the present invention have been described in considerable detail, many modifications and improvements to the present invention should be obvious to one skilled in the art. Therefore, it is not to be limited to the details as set forth herein except as may be necessitated by the appended claims.

I claim:
1. A heat engine comprising
   a multiplicity of thermally responsive elements of a thermal memory material secured between the ends of a pair of power levers, said elements having the memory property characteristic of shortening and lengthening when thermally cycled,
   means journalling each of said levers whereby as the thermally responsive elements are thermally cycled to shorten in length, the ends of the levers to which the elements are attached are drawn towards each other and the opposite or free ends of said levers separate from each other,
   means connected to said levers to effect the storage of energy when said thermally responsive elements are cycled to shorten, said energy storage means effecting separation of the ends of said levers to which the thermally responsive elements are attached when the elements are thermally cycled to elongate,
   means for thermally cycling said thermally responsive elements, and
   means for absorbing and translating the reciprocating motion of the levers into rotational motion.
2. The heat engine of claim 1 wherein the means for absorbing and translating the reciprocating motion of the levers into rotational motion includes a series of secondary levers secured to the free ends of said primary power levers, said series of secondary levers being interconnected through a power absorbtion means to a crank shaft which converts the reciprocal motion of the primary levers into rotational motion.
3. The heat engine of claim 1 wherein the means for thermally cycling said thermally responsive elements includes a pair of parallel different temperature baths for said elements, and mechanical means to alternately place said elements in one bath and then in the other bath to thermally cycle said elements.
4. The heat engine of claim 1 wherein the energy storage means includes a spring means for urging the free ends of said primary levers towards each other.
5. A nitinol heat engine comprising
   a pair of primary power levers journalled to permit the lower and upper ends of said levers to be reciprocated with respect to each other and the lower ends of said levers to be alternatively translated between and submerged in a pair of parallel different temperature baths,
   a multiplicity of nitinol elements secured to the lower ends of the pair of primary levers, said elements being formed to elongate when thermally cycled below their phase change temperature and to shorten when thermally cycled above it,
   means connected to said levers to effect the storage of energy when the nitinol elements are thermally cycled to shorten, said energy storage means effecting separation of the lower ends of said levers when the nitinol elements elongate, and
   means for absorbing and translating the reciprocating motions of the upper ends of the power levers into rotational motion.
6. The nitinol heat engine of claim 5 wherein the nitinol elements are straight wires.
7. The nitinol heat engine of claim 6 wherein the means for absorbing and translating the reciprocating motion of the levers into rotational motion includes a series of secondary levers secured to the free ends of said primary power levers, said series of secondary levers being interconnected through a power absorbtion means to a crank shaft which converts the reciprocal motion of the primary levers into rotational motion.
8. A nitinol heat engine comprising
   a pair of relatively vertically disposed primary power levers,
   a multiplicity of nitinol wire elements secured between the lower ends of said pair of primary levers, said wires being formed to elongate when thermally cycled below their phase change temperature and to shorten when thermally cycled above it,
   a front spreader beam journalled between said primary levers intermediate to the ends thereof at points between the free ends of said levers and said nitinol wires elements,
   a counter-weighted crank means journalled to said beam providing an oscillating motion to said beam whereby the nitinol wire elements can be alternately submerged in different temperature baths,
   means connected to said levers to effect the storage of energy when the nitinol elements are thermally cycled to shorten so that subsequently the energy storage means effects separation of the lower ends of said levers when the nitinol elements elongate, and
   means for absorbing and translating the reciprocating motion of the levers into rotational motion including a series of secondary levers secured to the free ends of said primary power levers, said series of secondary levers being interconnected through a power absorbtion means to a crank shaft which converts the reciprocal motion of the primary levers into the rotational motion.

9. The nitinol heat engine of claim 8 wherein the counter-weighted crank means provides a semi-circular motion to the lower ends of said levers to effect submerging the nitinol wires in a first temperature bath and then reversing direction to move the wires in a partially circular arc up and out of the first temperature bath and over and down into a second temperature bath and then reversing direction again to return the wires to the first temperature bath over the same path.

10. The nitinol heat engine of claim 8 wherein the series of secondary levers include a pair of walking beams journalled at one of their ends to the upper free ends of the primary power levers and journalled at their other ends to an interconnecting back spreader beam,
- a pair of secondary power take-off lever systems journalled intermediate the ends of the walking beams and supporting said beams,
- a crankshaft,
- a pair of connecting rods journalled to the take-off lever systems at one of their ends and to said crank shaft at the other of their ends,
- a fly wheel interconnected to said crank shaft,
- a power absorption system to cushion the shock on the engine resulting from the swiftness with which the phase change of the nitinol occurs, and
- means to effect both a pull down force on the back spreader beam to lift the wires from the baths, and a gentle upward force on the back spreader beam wherein said wires are immersed.

11. The nitinol heat engine of claim 10 wherein the power absorption system includes spring means disposed between the secondary power take off lever systems and the connecting rods to absorb the power translated by the power take-off means until it can be transferred through the connecting rods to the crankshaft.

12. A nitinol heat engine comprising
- a pair of relatively vertically disposed primary power levers,
- a multiplicity of nitinol wire elements secured between the lower ends of said pair of primary levers, said wires being formed to elongate when thermally cycled below their phase change temperature and to shorten when thermally cycled above it,
- a front spreader beam journalled between said primary levers intermediate to the ends thereof at points between the free ends of said levers and said nitinol wires elements,
- a counter-weighted crank means journalled to said beam to provide an oscillating motion to said beam whereby the nitinol wire elements can be alternately submerged in different temperature baths, said crank means providing a semi-circular motion to the lower ends of said levers to effect submerging the nitinol wires in a first temperature bath and then reversing direction to move the wires in a partially circular arc up and out of the first temperature bath and over and down into a second temperature bath and then reversing direction again to return the wires to the first temperature bath over the same path,
- a spring connected to said levers to store energy when the nitinol elements are thermally cycled to shorten, and to separate the lower ends of said levers when the nitinol elements elongate, and
- means for absorbing and translating the reciprocating motion of the levers into rotational motion including a series of secondary levers secured to the free ends of said primary power levers, said series of secondary levers including
  - a pair of walking beams journalled at one of their ends to the upper free ends of the primary power levers and journalled at their other ends to an interconnecting back spreader beam,
  - a pair of secondary power take-off lever systems journalled intermediate the ends of the walking beams and supporting said beams,
  - a crankshaft
  - a pair of connecting rods journalled to the take-off lever systems at one of their ends and to said crank shaft at the other of their ends,
  - a spring means disposed between the secondary power take-off lever systems and the connecting rods to absorb the power translated by the power take-off means until it can be transferred through the connecting rods to the crankshaft,
  - a fly wheel interconnected to said crank shaft, a power absorbtion system to cushion the shock on the engine resulting from the swiftness with which the phase change of the nitinol occurs, and
  - means to effect both pull down force on the interconnecting back spreader beam to lift the wires from the baths and a gentle upward force on the back spreader beam when said wires are immersed.

13. A heat engine comprising
- a multiplicity of thermally responsive wires of a thermal memory material, such as nitinol, secured to the end of a lever, said wires having the memory property characteristic of shortening and lengthening when thermally cycled,
- means connected to said lever to effect the storage of energy when said thermally responsive wires are cycled to shorten said stored energy being used to keep said wires taut when the wires are thermally cycled to lengthen and to reposition the lever for the wire shortening cycle,
- means for thermally cycling said thermally responsive wires, and
- means for absorbing and translating the motion of the lever into rotational motion.

14. The method of extracting power from thermally responsive memory elements in the form of a piece of straight wire comprising
- arranging said wire in tension between the ends of a pair of power levers which are the mirror image of each other, said wire having the memory property characteristic of shortening and lengthening when thermally cycled,
- thermally cycling said wire to shorten thereby drawing the ends of the levers to which the wire is attached towards each other and causing the other free ends of the levers to separate,
- mechanically absorbing the motion produced by the separation of the free ends of said levers,
- storing a portion of the absorbed energy
- converting the remaining portion of the absorbed energy mechanically into rotational energy
- thermally cycling said wire to lengthen
- using the stored energy to separate the ends of the power levers which are attached to the wire to keep it taut, and
- repeating the cycle.

* * * * *

UNITED STATES PATENT AND TRADEMARK OFFICE
CERTIFICATE OF CORRECTION

PATENT NO. : 4,257,231
DATED : March 24, 1981
INVENTOR(S) : Ridgway M. Banks

It is certified that error appears in the above—identified patent and that said Letters Patent is hereby corrected as shown below:

Column 2, line 42, "engine" should be --change--.

Column 7, line 9, "permitss" should be --permits--.

Column 8, line 26, "fact" should be --fact--.

Column 9, line 23, "possibly" should be --possibility--.

Column 9, line 25, after "half" insert --since each side of the machine, when it is divided in half--.

Column 9, line 59, before "all" delete "of".

Column 13, line 48, "wires" should be --wire--.

Signed and Sealed this

Thirtieth Day of June 1981

[SEAL]

Attest:

Attesting Officer

RENE D. TEGTMEYER

Acting Commissioner of Patents and Trademarks